US007052023B2

(12) United States Patent
Chen et al.

(10) Patent No.: US 7,052,023 B2
(45) Date of Patent: May 30, 2006

(54) MODULARIZED WHEEL CHAIRS

(75) Inventors: Zen-Jye Chen, Taichung (TW); Hsiang-Suen Lin, Taichung (TW); Wen-Huei Chung, Taichung (TW)

(73) Assignee: Aerospace Industrial Development Corporation, Taichung (TW)

( * ) Notice: Subject to any disclaimer, the term of this patent is extended or adjusted under 35 U.S.C. 154(b) by 134 days.

(21) Appl. No.: 10/898,159

(22) Filed: Jul. 26, 2004

(65) Prior Publication Data

US 2006/0017263 A1 Jan. 26, 2006

(51) Int. Cl.
*B62M 1/14* (2006.01)

(52) U.S. Cl. ................ 280/47.38; 280/647; 280/250.1; 280/649; 280/650; 280/47.4; 280/304.1; 297/61; 297/391

(58) Field of Classification Search ............ 280/250.1, 280/649, 650, 47.38, 47.4, 304.1, 647; 297/61, 297/391
See application file for complete search history.

(56) References Cited

U.S. PATENT DOCUMENTS 4,098,521 A * 7/1978 Ferguson et al. ........ 280/250.1
4,768,622 A * 9/1988 Nicklasson et al. ......... 188/2 D
4,962,942 A * 10/1990 Barnett et al. ............. 280/5.28
5,188,383 A * 2/1993 Thompson ............... 280/250.1
6,578,860 B1 * 6/2003 Chang ..................... 280/250.1

* cited by examiner

*Primary Examiner*—Christopher P. Ellis
*Assistant Examiner*—Cynthia F. Collado
(74) *Attorney, Agent, or Firm*—Rosenberg, Klein & Lee

(57) ABSTRACT

A wheel chair includes wheel frames which can be adjusted up and down, moving devices and brake devices are connected to two respective sides of the two wheel frames. Support devices are connected to the wheel frames so as to adjust the depth of the wheel frames to which arm rest devices are connected. A folding device is connected between the wheel frames and an assistant device is connected to the folding device. A positioning device is connected to the assistant device so that the wheel chair can be adjusted in many ways to meet different needs of users. The modularized devices effectively reduce manufacturing cost of the wheel chair.

8 Claims, 8 Drawing Sheets

MODULARIZED WHEEL CHAIRS

FIELD OF THE INVENTION

The present invention relates to a wheel chair that is composed of modularized units which are convenient to be assembled.

BACKGROUND OF THE INVENTION

Many known wheel chairs are disclosed such as those disclosed in DE 3742547, GB 2101540, U.S. Pat. Nos. 4,648,619, 4,721,321, 4,730,842, 5,28,183, 5,522,404, 6,296,265, 6,338,496, 6,345,833, 6,499,756, 6,499,762, 6,648,359, and 5,522,404. DE 3,742,547, U.S. Pat. Nos. 4,648,619, 4,721,321, 4,730,842, and 6,338,496 discloses wheel chairs wherein the rear wheels are pivotably connected one of multiple holes on the side frames. U.S. Pat. No. 4,721,321 discloses that the arm rests are connected to a quick release device on a side of the seat frame. U.S. Pat. Nos. 6,338,496 and 6,648,359 disclose that the arm rests are threaded to the holes in the back rest frame, the height of the arm rest can be adjusted, however, cannot be tilt. U.S. Pat. Nos. 4,730,842, 4,721,321, and 6,338,496 disclose that the front frame includes extension tubes for connecting the foot rests. U.S. Pat. Nos. 6,338,496 and 6,499,756 disclose that the foot rests are connected to the wheel frames by threaded sleeves, U.S. Pat. No. 6,499,756 employs a spring to position the foot rests which is allowed to be pivotable. U.S. Pat. Nos. 4,648,619, 4,721,321, 5,328,183, 6,499,762 and GB 2101540 disclose that the folding device cannot be disengaged from the frames. U.S. Pat. No. 5,522,404 uses a safety belt. U.S. Pat. No. 4,730,842 discloses that the arm rests are rotatably connected to the backrest frame by a special member and the foot rests can be rotatably folded but cannot provide comfortable use. The seat pad is connected to the frame by Velcro strips and the width of the wheel chair can be adjusted but cannot be folded. It is noted that the conventional wheel chairs cannot provide a wide range of adjustments to meet needs of different users. Some parts cannot be independently separated from the main frame so that a huge assembly has to be replaced in maintenance, and this spends a lot.

The present invention intends to provide a wheel chair which is composed of several units which are able to be adjusted according to the needs of different users.

SUMMARY OF THE INVENTION

The present invention relates to a modularized wheel chair that comprises two wheel frames, moving devices connected to two respective sides of the two wheel frames, brake devices, and support devices connected to the wheel frames. The wheel frames each include a support rod and a seat positioning portion at one end of the support rod which is connected to a post. The other end of the support rod has a front wheel positioning portion which is connected to the post by a transverse rod. The post includes two connection rods whose respective two ends are connected with each other to form a wheel frame. A shaft device is connected between the two wheel frames. The moving devices each include a front wheel unit connected to a front wheel positioning portion and a rear wheel unit connected to a rear wheel positioning member. The brake device includes a clamp member which is respectively connected to the first rod and a transverse connection member which has one end pivotably connected to a stop on the rear wheel unit and the other end of the transverse connection member is connected to a lever which is connected to the stop by a connection member. The support devices includes a seat frame which includes a plurality of positioning holes and a backrest frame includes an angle adjusting portion. The seat frame is connected to the backrest frame by a backrest frame positioning member and the seat frame are connected to two seat frame adjusting members on the support rod.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
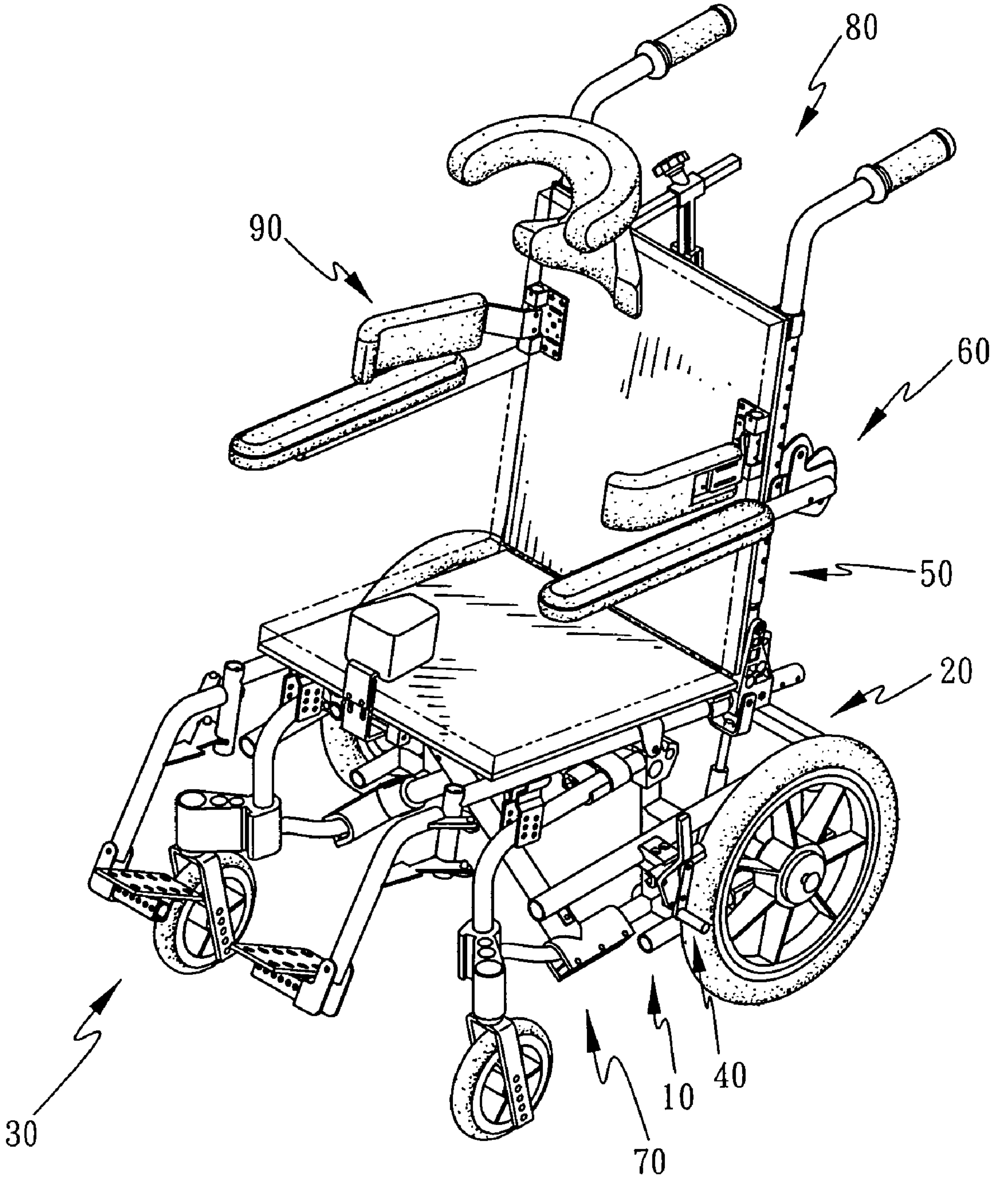
FIG. 1 is a perspective view to show the wheel chair of the present invention.
Figure 2:
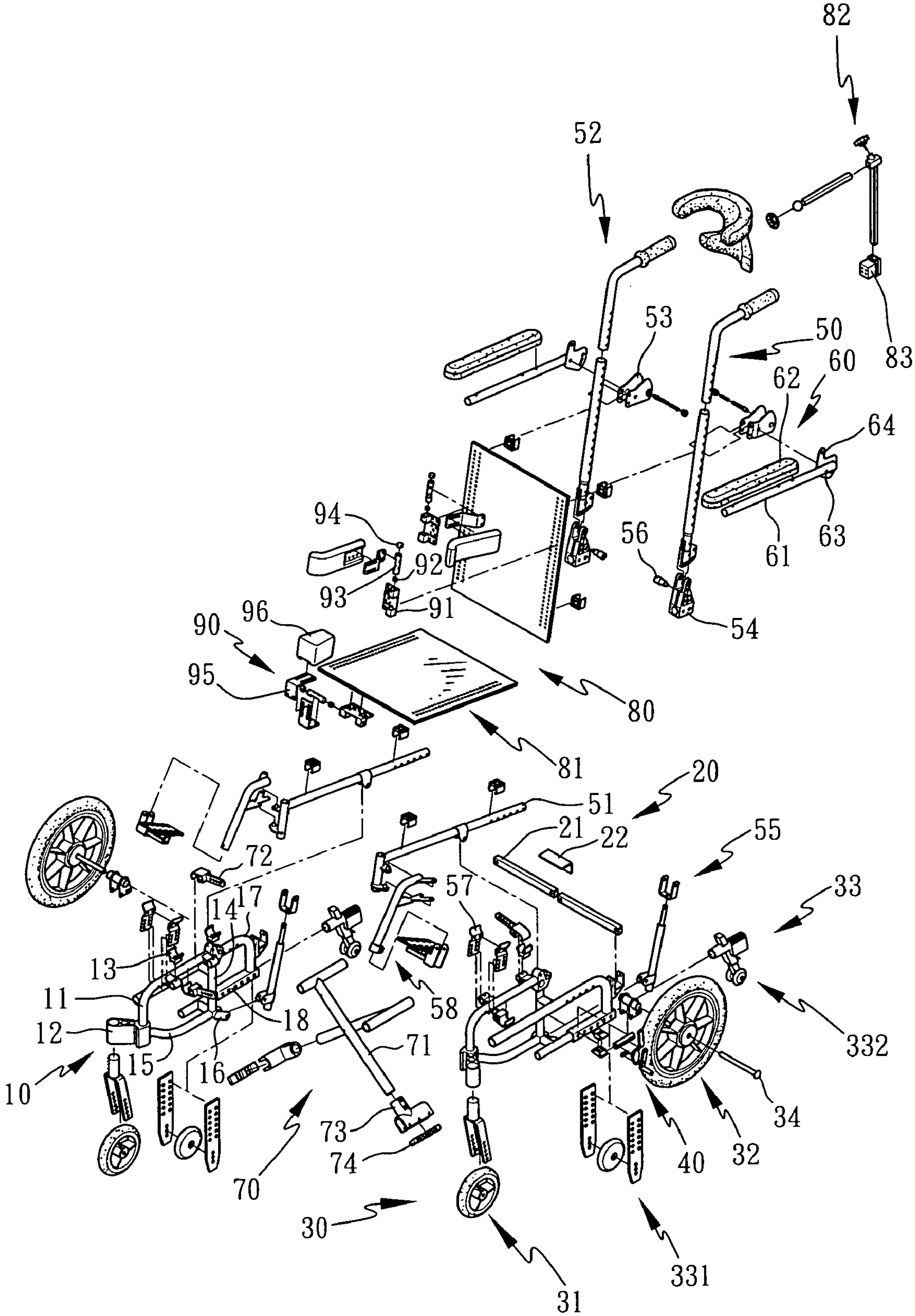
FIG. 2 is an exploded view to show the wheel chair of the present invention.

Referring to FIGS. 1 and 2, the wheel chair of the present invention comprises two wheel frames 10, a shaft device 20 connected between the two wheel frames 10, quick release moving devices 30, brake devices 40, support devices 50, arm rest devices 60, folding devices 70, assistance devices 80 and a positioning device 90.

Figure 3:
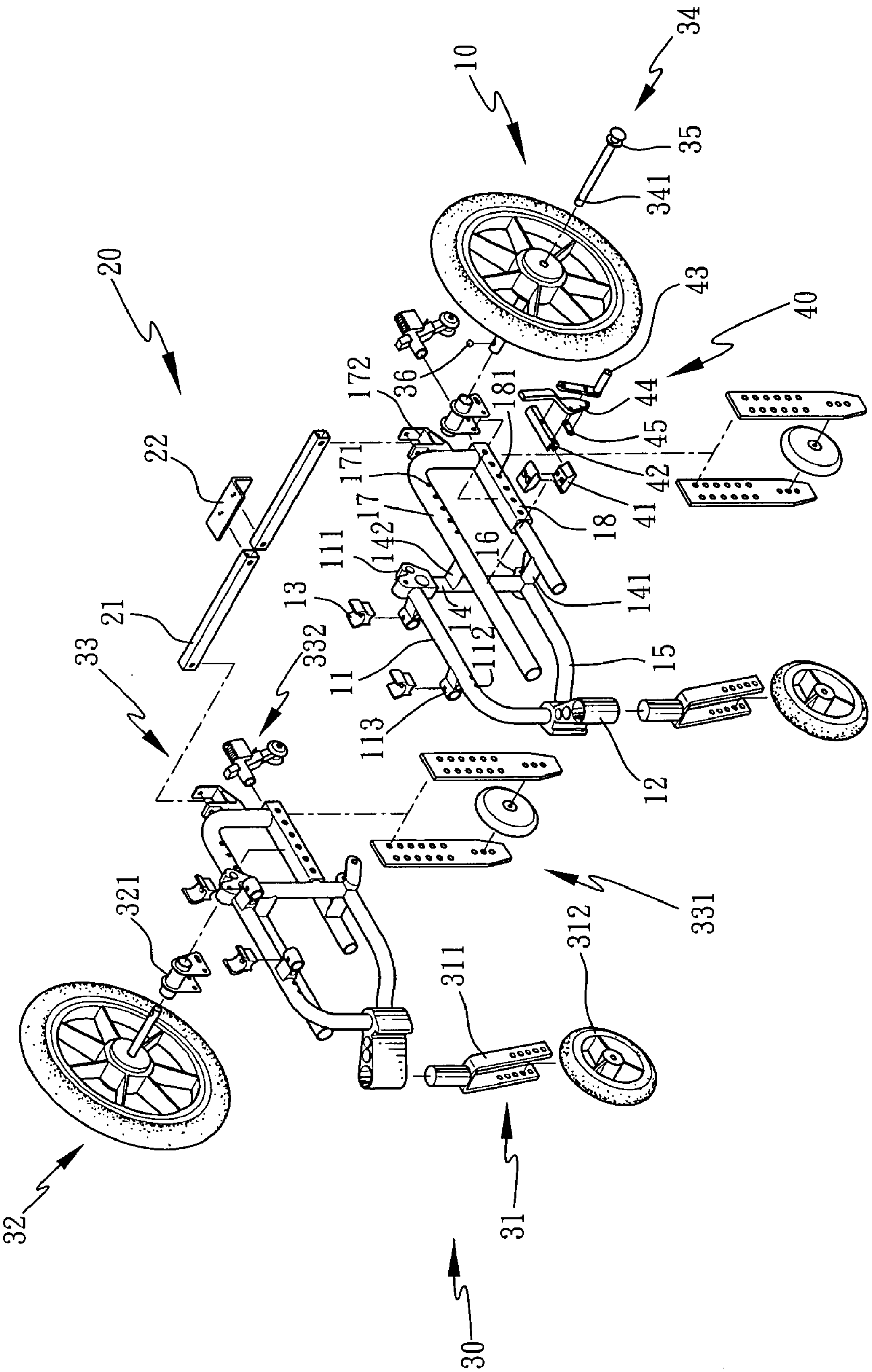
FIG. 3 shows the wheel frames of the present invention.

Referring to FIG. 3, the wheel frames 10 each includes an L-shaped support rod 11 and a front wheel positioning portion 12 is connected to a short section of the support rod 11 and a multiple-hole seat positioning portion 111 is connected to a long section of the support rod 11. A plurality of positioning holes 112 are defined in the bent portion of the support rod 11 and two horizontal tubes 113 are connected on a side of the support rod 11 so as to be threaded to a connection member 13. The seat positioning portion 111 is connected perpendicularly to a post 14 on the wheel frame 10. The post 14 includes several splitting potions which include a transverse lower connection rod 141, a transverse rod 15 and two cylinder positioning portions 16 having holes. The transverse rod 15 is connected to the front wheel positioning portion 12 so as to form the front section of the wheel frame 10.

The post 14 has a connection rod 142 transversely extending from a middle portion thereof and a free end of the connection rod 142 is connected to a first rod 17 which includes a plurality of rear wheel upper positioning holes 171. A shaft positioning portion 172 is connected to a short section of the first rod 17 and a second rod 18 is connected a distal end of the short section. A plurality of rear wheel lower positioning holes 181 are defined in the second rod 18 and a distal end of the second rod 18 is connected to the transverse lower connection rod 141 so as to form a stable and reliable wheel frame 10.

The shaft device 20 connected between the two wheel frames 10 includes two hollow tubes 21 which are connected to each other head to tail by a plate 22, and two respective free ends are respectively connected to the shaft positioning portions 172 so as to form a folding mechanism.

The quick release moving devices 30 each include a quick release front wheel unit 31, a rear wheel unit 32 and an assistant wheel unit 33. The front wheel unit 31 includes a front wheel frame 311 which has one end threaded to the front wheel positioning portion 12 and the other end of the front wheel frame 311 is adjustably connected to the front wheel 312 by one of the through holes thereof. The rear wheel unit 32 is connected to the positioning hole 171 and 181 of the rear wheel positioning member 321 by using quick release devices 34. The quick release devices 34 has a biasing member 35 installed in a recess 341 defined in an end thereof and the end is inserted in the shaft and a bead 36 is received in a hole so as to be engaged with the recess 341. By pressing the quick release device 34, the bead 36 is moved into the hole or protrudes from the shaft.

The second rod 18 is connected to the assist wheel unit 33 and a straight moving wheel 331 is connected to the lower positioning hole 181 so as to increase the stability of forward movement. A free end of the second rod 18 is connected to a side moving wheel 332 so as to save efforts when moving the wheel chair a side.

The brake device 40 includes a clamp member 41 which includes a groove in each of two ends thereof so as to respectively connect to the first rod 17 and a transverse connection member 42 which has one end pivotably connected to a stop 43 on the rear wheel unit 32 and the other end of the transverse connection member 42 is connected to a lever 44 which is connected to the stop 43 by a connection member 45. The lever 44 includes an incline section so as to drive the stop 43 to press the rear wheel unit 32 to brake.

Figure 4:
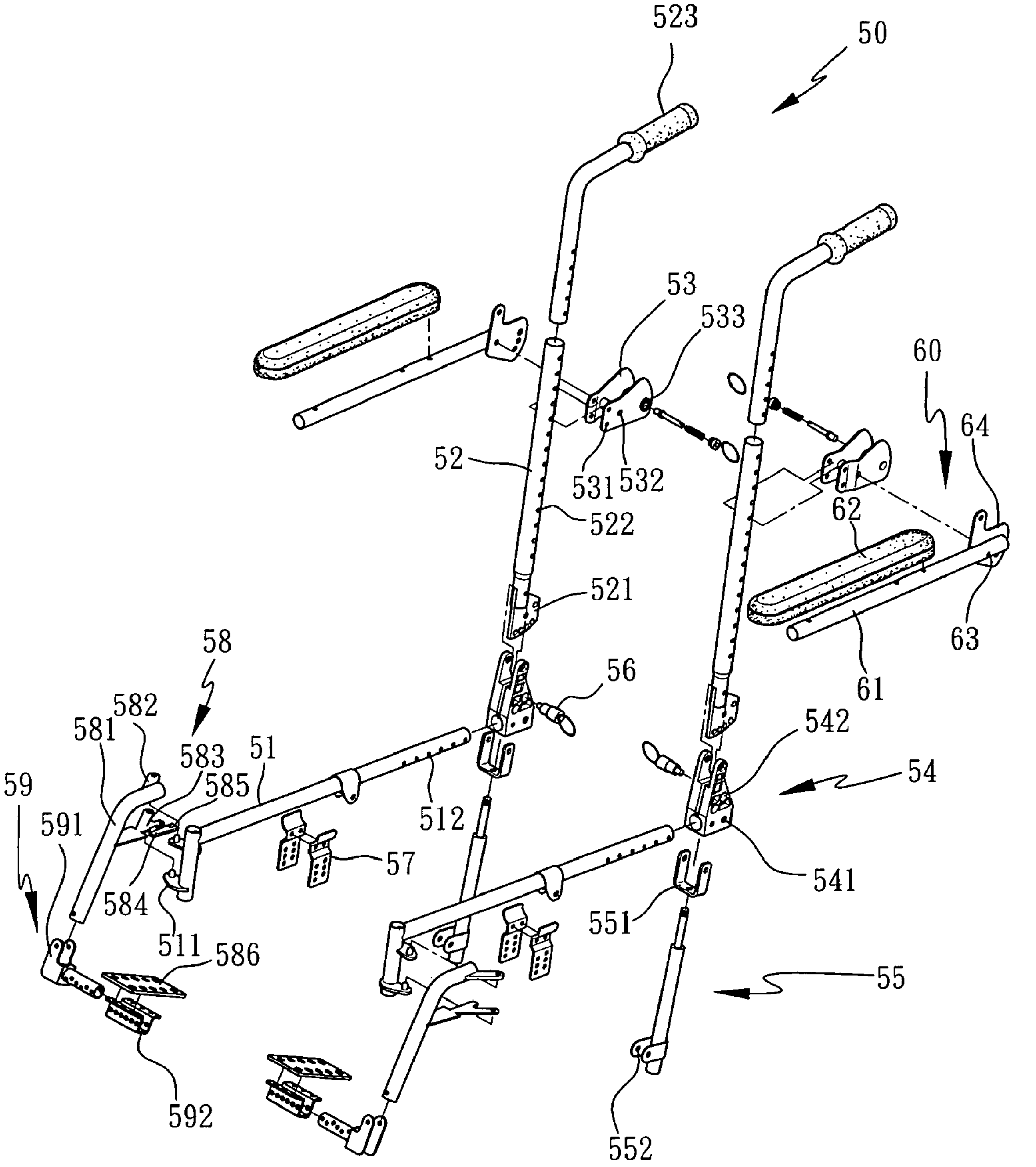
FIG. 4 shows the support device of the present invention.

Referring to FIG. 4, the support devices 50 are respectively connected to the wheel frames 10 on two sides of the wheel chair and includes an L-shaped seat frame 51. Two foot rest locking portions 511 are connected to the short section of the seat frame 51 and a plurality of positioning holes 512 are defined in the long section of the seat frame 51. The backrest frame 52 includes a plurality of upright tubes and an angle adjusting portion 521 are defined in a long section thereof. The backrest frame 52 includes a locking portion 522 for connecting an adjusting member 523 which has holes defined in its free end thereof, so as to form a backrest frame 52 which can be adjusted in length. The locking portion 522 is connected to a double-layer arm rest adjusting member 53 which has a threading portion 531 at its narrow end so as to be connected to the backrest frame 52, a middle section of the adjusting member 53 includes an arm rest connection hole 532, and an arm rest positioning portion 533 is connected to its wide end of the adjusting member 53.

A backrest frame positioning member 54 includes connection holes 541 which are in alignment with the positioning holes 512 in the seat frame 51 so as to adjust the seat frame 51 forward and backward. The middle section of the backrest frame positioning member 54 has backrest frame positioning holes 542 which are connected to the angle adjusting portion 521 of the backrest frame 52 by pins 56. By pulling the pins 56, the adjusting member 523 can rotate the angle adjusting portion 521 to a desired position and the pins 56 are then inserted in the alignment positioning holes 542 to set the backrest frame 52 at a specific angle. The rest of the connection holes 541 are connected to the cylinder securing members 551 of the one-direction cylinder 55 which has a connection portion 252 so as to be connected with is connected to the two cylinder positioning portions 16.

Two seat frame adjusting members 57 are connected with each other at a middle portion thereof and the seat frame 51 is rested in a up-facing recess of the combination of the seat frame adjusting members 57. The bottom-facing recess of the combination of the seat frame adjusting members 57 includes a plurality of holes to be connected with the positioning holes 112 of the support rods 11.

The foot rest unit 58 includes an L-shaped support rod 581 which has a pivotable portion 582 and a positioning member 583 on the foot rest locking portion 511 at a short section of the support rod 581. A flexible fork 584 is connected to the free end of the positioning member 583 and includes two ends, one of which is connected to the seat frame 51 and the other end is connected to an activation portion 585. When pressing the activation portion 585, the flexible fork 584 releases the seat frame 51 and the support rod 581 can be pivoted and disengaged from the locking portion 511 so that the user may easily sit in the seat or separate the whole wheel chair.

An L-shaped angle adjusting unit 59 is connected to a long section of the support rod 581 and includes a U-shaped portion threaded to the support rod 581. A plurality of holes are defined through a vertical section of the angle adjusting unit 59. The holes are adjusted to positions where are in alignment with holes defined in a positioning member 592 threaded to the foot rests 586, pins or bolts are inserted through the alignment holes to adjust the foot rests 586.

The arm rest device 60 includes an arm rest support frame 61 with a pad 62 connected thereon, a plurality of connection holes 63 are defined in a free end of the arm rest support frame 61 so as to be in alignment with the arm rest connection hole 532. A backrest securing portion 64 includes several curve slots defined in a free end thereof and the pins 56 are engaged with the slots so as to set the backrest 52 in different angles including a horizontal position.

Figure 5:
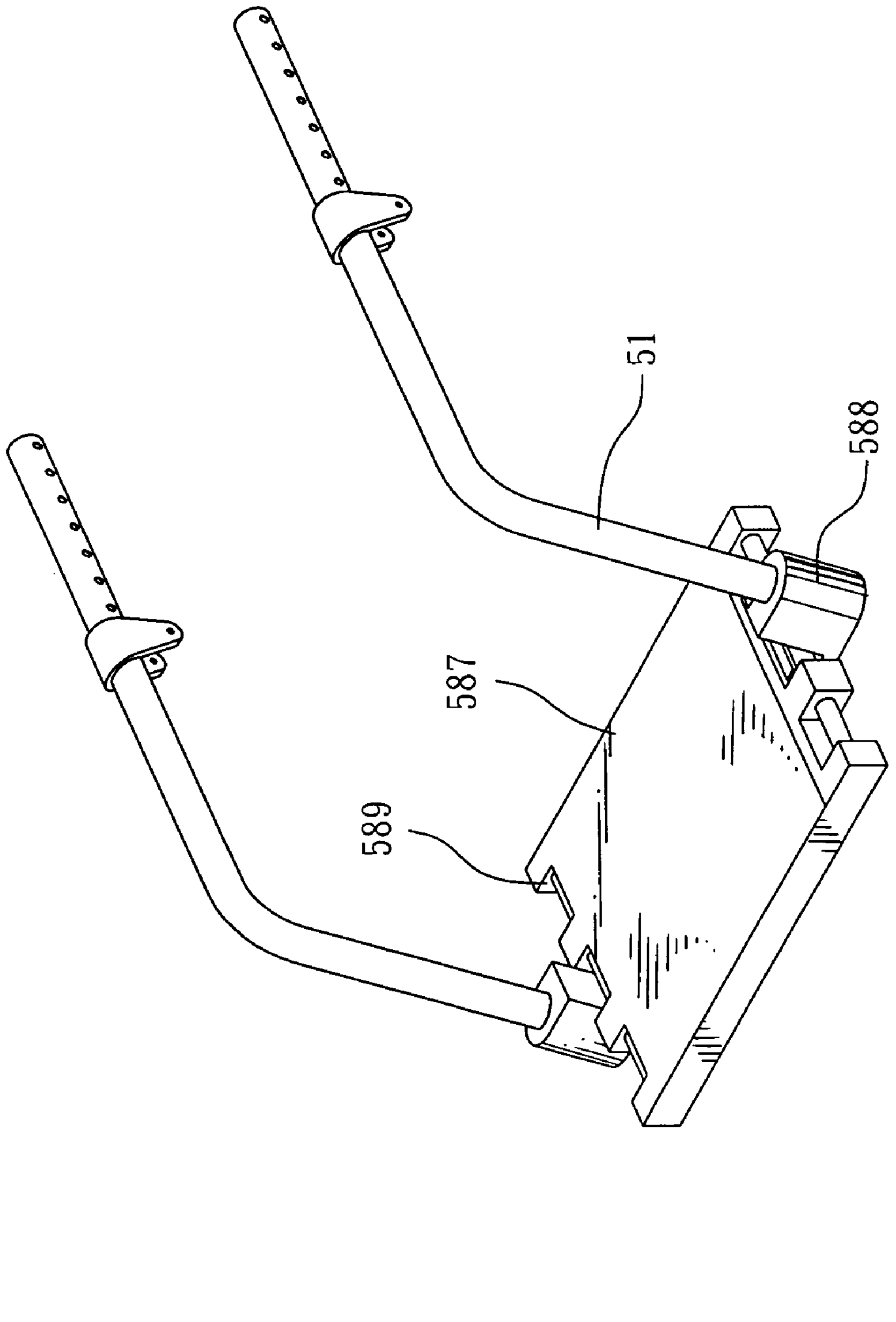
FIG. 5 shows another embodiment of the support device for foot rest of the present invention.

The foot rest unit 58 can also be a one-piece foot rest 587 as shown in FIG. 5, the seat frame 51 includes pairs of hooking members 588 and the foot rest 587 includes holes 589 which are engaged with the hooking members 588 so that the foot rest 587 may bear a large load. When the hooking members 588 are disengaged from the holes 589, the foot rest 587 can be disengaged from the frame.

Figure 6:
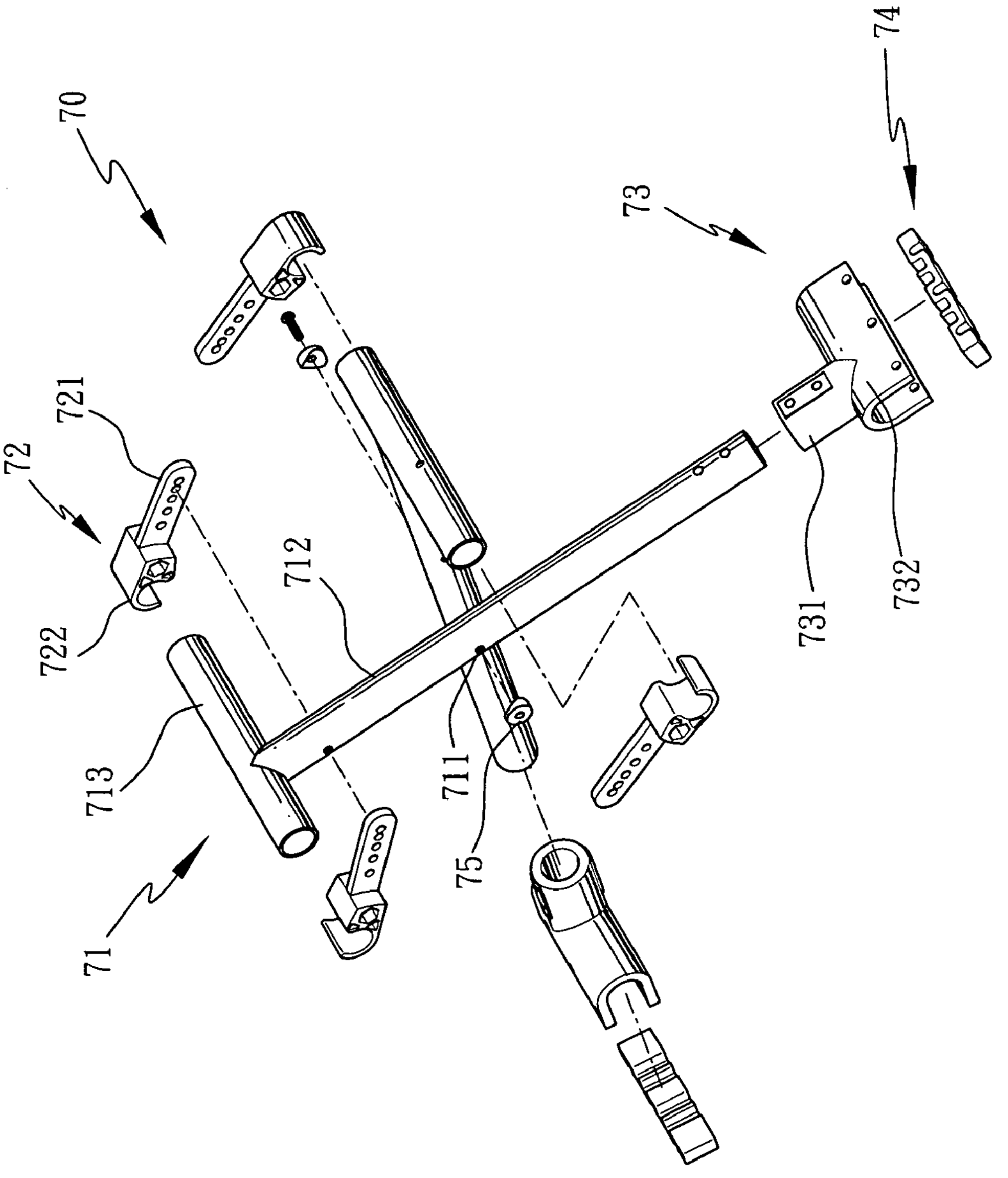
FIG. 6 shows the folding device of the present invention.

As shown in FIG. 6, the folding devices 70 are located between the wheel frames 10 and include two crossbars 71 which are pivotably connected with each other at center holes 711 thereof. A lever 713 is connected to an end of the main frame 712 and is directly connected to the mounting members 13. At least one set of connection member 72 are pivotably connected to an end of the lever 713 and the other end of the lever 713 is fixed to the pivotable member 73 on the transverse rod 15. The connection portion 72 includes a porous plate-like support rod positioning portion 721 and the other end is connected with a C-clamp 722. The two respective C-clamps 722 secure the support rod 11. The pivotable member 73 includes a securing portion 731 which is fixed to the main frame 712 and a semi-opened sleeve 732 is connected to a free end of the pivotable member 73 so as to be connected to the transverse rod 15 with cooperation of a cap 74. Besides, the main shaft 712 has a assistant member 75 so as to firmly combine the parts.

Figure 7:
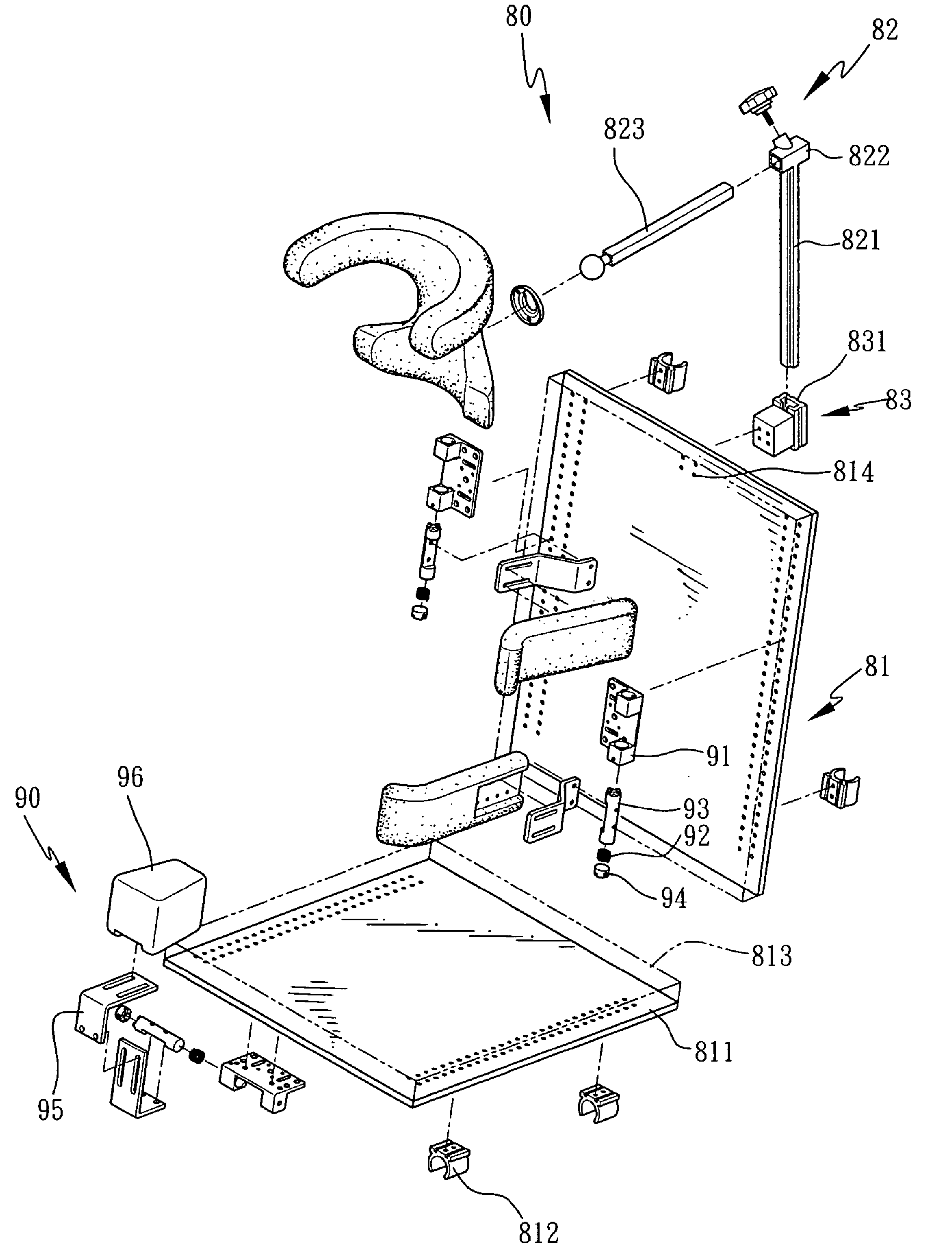
FIG. 7 shows the assistant device of the present invention.

As shown in FIG. 7, the assistant device 80 includes a pad 81 and a head rest 82. The pad 81 includes a board 811 with Velcro strips and holes are defined in two sides thereof so as to be connected with C-clamps 812 on the seat frame 51 or on the back rest 52. A cushion pad 813 is attached to the Velcro strips on the board 811 to provide better cushion feature. When the pad 81 is used as a backrest and cooperated with the head rest 82, a plurality of securing holes 814 are defined in a side thereof so as to secure a securing member 83 which includes a connection portion 831 so as to be connected to the head rest post 821 by long bolts. A free end of the head rest post 821 is pivotably connected to a free end of the transverse bar 823 of the head rest 822.

Figure 8:
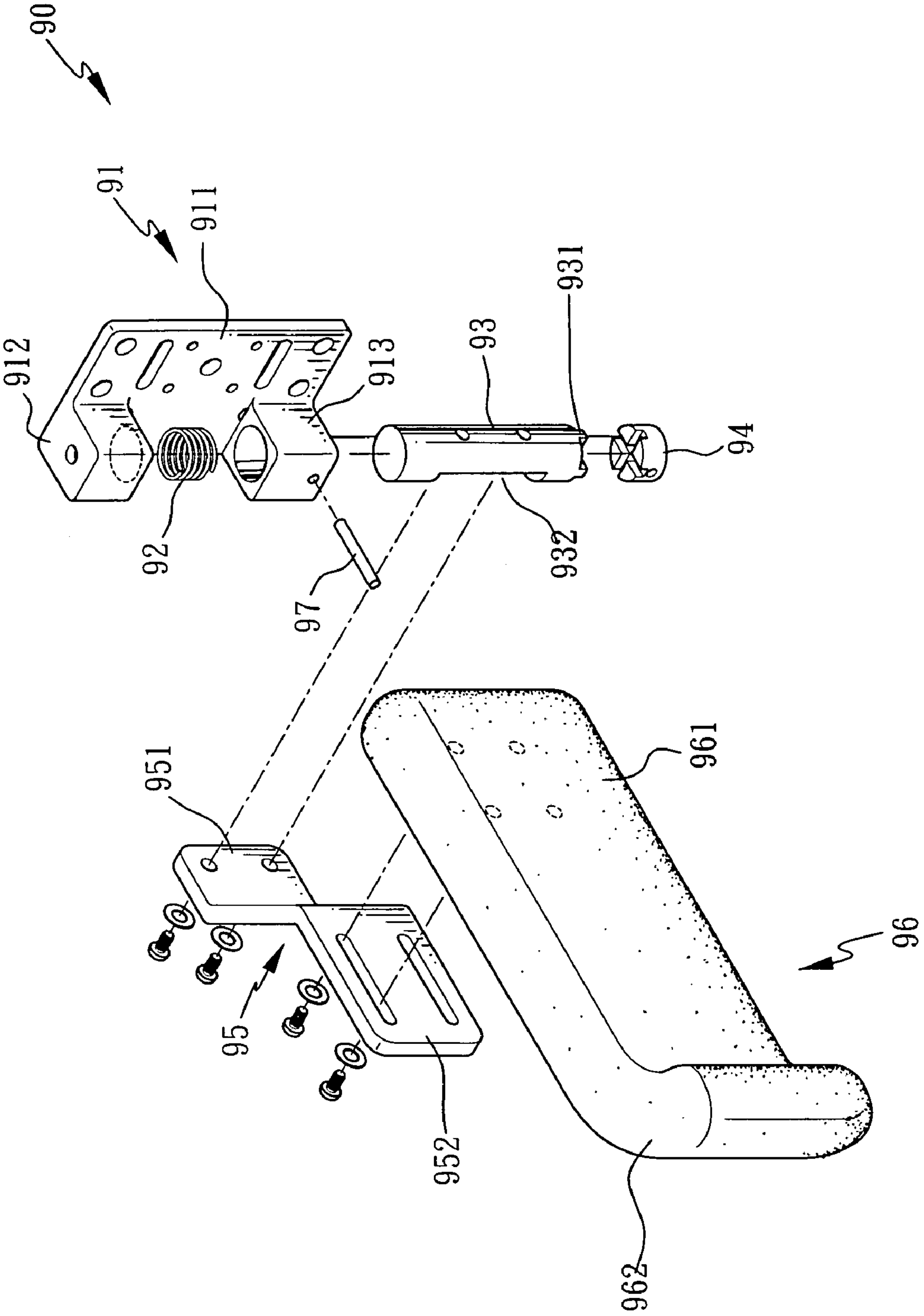
FIG. 8 shows the exploded view of the protection device of the present invention.

As shown in FIGS. 7 and 8, the positioning device 90 includes a base 91 with several holes 911 in one side so as to be connected with the wheel chair and the other side of the base 91 includes a first positioning portion 912 and a second positioning portion 913 which includes a passage. The first positioning portion 912 has a recess facing the second positioning portion 913 so that a spring 92 and an end of a rotation piece 93 are received in the recess. An end of the rotation piece 93 is biased by the spring 92 and the other end of the rotation piece 93 includes positioning portions 931 to set the angular positions at 90 and 180 degrees for example. A limitation member 94 includes a cross-shaped recess and the rotation piece 93 includes a surface 932 with a plurality of threaded holes so as to be connected to the connection plate 95 secured to the protection plate 96. The limitation member 94 is secured by the pins 97 extending through the second positioning portion 913. The surface 932 of the rotation piece 93 may be any form other than the surface, an assistant piece 75 can be used on the cylindrical surface of the rotation piece 93.

The connection plate 95 has one end fixed to the fixing portion 951 and the other end has a threaded portion 952. The protection plate 96 has one end fixed to the connection portion 961 and includes a positioning portion 962 to guide and position the body of the user. When the protection plate 96 is used as a protection member, the connection plate 95 can be composed of multiple parts. When the protection plate 96 is used as a chest protection member, the second positioning portion 912 is oriented downward and connected to two sides of the board 811 so that when the user sits in the wheel chair, he or she exerts a force to the protection plate 96 makes sure that the rotation piece 93 on the base 91 is firmly connected to the limitation member 94 of the second positioning portion 912.

While we have shown and described the embodiment in accordance with the present invention, it should be clear to those skilled in the art that further embodiments may be made without departing from the scope of the present invention.

What is claimed is:

1. A modularized wheel chair comprising:

two wheel frames, moving devices connected to two respective sides of the two wheel frames, brake devices, support devices connected to the wheel frames, the wheel frames each including a support rod and a seat positioning portion at one end of the support rod being connected to a post, the other end of the support rod having a front wheel positioning portion which is connected to the post by a transverse rod, the post including two connection rods whose respective two ends connected with each other to form a wheel frame, a shaft device connected between the two wheel frames;

the moving devices each including a front wheel unit and a rear wheel unit, the front wheel unit connected to a front wheel positioning portion and the rear wheel unit connected to a rear wheel positioning member;

the brake device including a clamp member which is respectively connected to the first rod and a transverse connection member which has one end pivotably connected to a stop on the rear wheel unit and the other end of the transverse connection member is connected to a lever which is connected to the stop by a connection member, and the support devices including a seat frame which includes a plurality of positioning holes and a backrest frame including an angle adjusting portion, the seat frame connected to the backrest frame by a backrest frame positioning member, the seat frame connected to two seat frame adjusting members on the support rod.

2. A modularized wheel chair comprising:

two wheel frames connected to supporting devices, two folding devices connected between the two wheel frames, each wheel frame having an arm rest device and an assistant wheel unit connected to the arm rest device, the wheel frames each including a support rod and a seat positioning portion at one end of the support rod being connected to a post, the other end of the support rod having a front wheel positioning portion which is connected to the post by a transverse rod, the post including two connection rods whose respective two ends connected with each other to form a wheel frame, a shaft device connected between the two wheel frames;

the support devices including a seat frame which includes a plurality of positioning holes and a backrest frame including an angle adjusting portion, the seat frame connected to the backrest frame by a backrest frame positioning member, the seat frame connected to two seat frame adjusting members on the support rod, a locking portion of the back rest frame connected to an arm rest adjusting member by positioning members;

the folding device having two crossbars and one end of the crossbars connected to a lever and the other end connected to a pivotable member, one end of the pivotable member connected to a securing portion of the crossbar and the other end of the pivotable member connected to a semi-opened sleeve so as to connect the transverse rod and covered by a cap, the crossbars connected to the wheel frame by at least one set of connection member, the connection member having a support rod positioning portion which is pivotably connected to the crossbars and the other end pivotably connected to the support rod and the transverse rod;

the arm rest device having an arm rest support frame so as to be connected to the adjusting member, and an assistant device including a pad and a head rest, the pad including a board, a cushion pad attached to one side of the board and a plurality of threaded holes defined in two sides of the other side of the cushion pad so as to secure a securing member, a plurality of securing holes defined in a side of the board so as to connect the head rest.

3. The wheel chair as claimed in claim 1, wherein a straight moving wheel is connected to the lower positioning hole so as to increase the stability of forward movement, a free end of the second rod is connected to a side moving wheel so as to save efforts when moving the wheel chair a side.

4. The wheel chair as claimed in claim 2, wherein the head rest is connected to a securing member which is connected to a connection portion by a connection portion on a base which is pivotably connected to the securing holes in the board, a free end of the head rest post pivotably connected to a free end of the transverse bar of the head rest.

5. The wheel chair as claimed in claim 1, wherein the quick release devices has a biasing member installed in a recess defined in an end thereof and the end is inserted in the shaft and a bead is received in a hole so as to be engaged with the recess, by pressing the quick release device, the bead is moved into the hole or protrudes from the shaft.

6. The wheel chair as claimed in claim 2, wherein the folding device includes assistant member to snugly connect a main frame of the crossbars and cooperated parts.

7. A modularized wheel chair comprising:

two wheel frames, moving devices connected to two respective sides of the two wheel frames, brake devices, support devices connected to the wheel frames and folding device connected between the support devices, the support devices having an arm rest device and the support devices having an assistant device to which a positioning device is connected, the positioning device including a base, a spring, a rotation piece, a limitation member and a protection member, the base having an end connected to the wheel chair and the other end of the base connected to the protection member by the rotation piece, the limitation member located between one end of the rotation piece and base, the other end of the rotation piece biased by the spring, a middle portion of the rotation piece secured to the protection member.

8. The wheel chair as claimed in claim 7, wherein tow ends of the base of the positioning device are connected with a first positioning portion and a second positioning portion, the first positioning portion having a recess and the spring is received therein, the limitation member connected to the second positioning portion, the base having several holes so as to fix pins to the wheel chair, the rotation piece including a surface so as to be connected to a connection plate secured to the protection plate, the limitation member and the positioning portions of the rotation piece being secured with each other, the connection plate composed of at least one set of stepped surfaces, an end of the connection plate fixed to the positioning portions of the rotation piece and the other end of the connection plate connected to a connection portion of the protection member.

* * * * *